US011438278B2

(12) United States Patent
Gnaneswaran et al.

(10) Patent No.: US 11,438,278 B2
(45) Date of Patent: Sep. 6, 2022

(54) CONTAINER-AWARE APPLICATION DEPENDENCY IDENTIFICATION

(71) Applicant: VMWARE, INC., Palo Alto, CA (US)

(72) Inventors: Dinesh Babu Thirukondan Gnaneswaran, Bangalore (IN); Subrahmanyam Mannam, Bangalore (IN); Gaurav Gupta, Bangalore (IN); Hemanth Kumar Kilari, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 917 days.

(21) Appl. No.: 14/841,737

(22) Filed: Sep. 1, 2015

(65) Prior Publication Data

US 2016/0380916 A1 Dec. 29, 2016

(30) Foreign Application Priority Data

Jun. 29, 2015 (IN) .......................... 3291/CHE/2015

(51) Int. Cl.
*H04L 47/80* (2022.01)
*G06F 9/455* (2018.01)
(Continued)

(52) U.S. Cl.
CPC ........ *H04L 47/803* (2013.01); *G06F 9/45558* (2013.01); *G06F 9/50* (2013.01);
(Continued)

(58) Field of Classification Search
CPC . H04L 47/803; H04L 41/046; H04L 43/0876; G06F 9/00; G06F 94/5558;
(Continued)

(56) References Cited

U.S. PATENT DOCUMENTS 9,575,781 B1* 2/2017 Suit .......................... G06F 9/455
2010/0107163 A1* 4/2010 Lee ..................... G06F 9/45533
718/1
(Continued)

OTHER PUBLICATIONS

Zhao, et al. (Aug. 2008). VNIDS: A virtual machine-based network intrusion detection system. In Anti-counterfeiting, Security and Identification, 2008. ASID 2008. 2nd International Conference on (pp. 254-259). IEEE. Retrieved from http://ieeexplore.ieee.org/abstract/document/4688384/.*

(Continued)

*Primary Examiner* — Lance Leonard Barry
*Assistant Examiner* — Timothy Sowa
(74) *Attorney, Agent, or Firm* — Patterson & Sheridan, LLP (57) ABSTRACT

Techniques disclosed herein provide an approach for identifying application dependencies in a hybrid environment in which one or more applications run in operating system (OS)-less containers. One embodiment provides a computer-implemented method that includes monitoring network traffic at one or more host computer systems, wherein OS-less containers run in at least one of the host computer systems. The method further includes monitoring network traffic at virtual bridges to which the OS-less containers are attached, and identifying network dependencies based on the monitored network traffic at the host computer systems and the monitored network traffic at the virtual bridges. In addition, the method includes determining the application dependencies based on the identified network dependencies.

15 Claims, 3 Drawing Sheets

(51) Int. Cl.
  *G06F 9/50* (2006.01)
  *H04L 41/046* (2022.01)
  *H04L 43/0876* (2022.01)
(52) U.S. Cl.
  CPC ............. *G06F 2009/45591* (2013.01); *G06F 2009/45595* (2013.01); *H04L 41/046* (2013.01); *H04L 43/0876* (2013.01)
(58) Field of Classification Search
  CPC . G06F 2009/45591; G06F 2009/45595; G06F 94/55; G06F 9/50; G06F 9/45558; G06F 9/455
  USPC .......................................... 709/224
  See application file for complete search history.

(56) References Cited

U.S. PATENT DOCUMENTS

| | | | | |
|---|---|---|---|---|
| 2010/0318990 | A1* | 12/2010 | Hou | G06F 9/45533 718/1 |
| 2012/0072258 | A1* | 3/2012 | Hull | G06Q 10/0633 705/7.27 |
| 2012/0166597 | A1* | 6/2012 | Babey | G06F 8/61 709/220 |
| 2013/0055256 | A1* | 2/2013 | Banga | G06F 21/53 718/1 |
| 2013/0159999 | A1* | 6/2013 | Chiueh | G06F 9/45504 718/1 |
| 2015/0261653 | A1* | 9/2015 | Lachambre | G06F 11/3616 717/126 |
| 2016/0112270 | A1* | 4/2016 | Danait | H04L 41/142 709/220 |
| 2016/0254964 | A1* | 9/2016 | Bene | H04L 41/0853 709/223 |
| 2016/0359705 | A1* | 12/2016 | Parandehgheibi | H04L 63/1425 |

OTHER PUBLICATIONS

Shan, et al. (Mar. 2012). Facilitating inter-application interactions for OS-level virtualization. In ACM SIGPLAN Notices (vol. 47, No. 7, pp. 75-86). ACM. Retrieved from https://dl.acm.org/citation.cfm?id=2151036.*

* cited by examiner

CONTAINER-AWARE APPLICATION DEPENDENCY IDENTIFICATION

RELATED APPLICATIONS

Benefit is claimed under 35 U.S.C. 119(a)-(d) to Foreign application Serial No. 3291/CHE/2015 filed in India entitled "CONTAINER-AWARE APPLICATION DEPENDENCY IDENTIFICATION", on Jun. 29, 2015, by VMware, Inc., which is herein incorporated in its entirety by reference for all purposes.

BACKGROUND

The importance of understanding application dependency in virtualized environments has been recognized. For example, datacenter migration preplanning typically includes considering application dependency to ensure applications that depend on each other are migrated together. VMware® Application Dependency Planner is a commercially available tool providing application discovery and dependency mapping for virtual environments.

Applications may also be deployed in hybrid environments in which some applications run in VMs, other applications run in physical servers, and still other applications run in operating system (0S)-less containers. OS-less containers implement operating systemlevel virtualization, where an abstraction layer is provided on top of the kernel of an operating system on a host computer and the abstraction layer supports multiple OS-less containers each including an application. Each OS-less container runs as an isolated process in userspace on the host operating system and shares the kernel with other containers, and the OS-less containers rely on the kernel's functionality to make use of resource isolation (CPU, memory, block I/O, network, etc.) and separate namespaces and to completely isolate the application's view of the operating environments. Traditional techniques for determining application dependency based on network traffic are unable to identify application dependencies involving OS-less containers. The internal container network and private internet protocol (IP) addresses for each of the OS-less containers is typically hidden, while network traffic from the containers all use the same public IP address and port number associated with the virtual Ethernet bridge to which the containers are connected. As a result, traditional techniques are unable to distinguish between multiple OS-less containers and the applications running therein.

SUMMARY

One embodiment provides a computer-implemented method of identifying application dependencies in a hybrid environment in which one or more applications run in operating system (OS)-less containers. The method generally includes monitoring network traffic at one or more host computer systems, where OS-less containers run in at least one of the host computer systems. The method further includes monitoring network traffic at virtual bridges to which the OS-less containers are attached, and identifying network dependencies based on the monitored network traffic at the host computer systems and the monitored network traffic at the virtual bridges. In addition, the method includes determining the application dependencies based on the identified network dependencies.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for determining application dependencies in a hybrid environment in which applications run in virtual machines (VMs) and physical servers, as well as in operating system (OS)-less containers. In one embodiment, agents running inside OS-less container host systems, which may be VMs or physical machines, monitor both network traffic at the host systems and network traffic at virtual bridges to which the OS-less containers are attached. The agents then identify network dependencies based on the two types of monitored network traffic and transmit the network dependency information to a central server. As used herein, network dependency refers to dependency of an application on a remote service at a certain interne protocol (IP) address and port, or vice versa. By considering both the network traffic at the host system level and the network traffic at the virtual bridge level, which indicates incoming and outgoing connections to/from particular OS-less containers connected to the bridge, the agents are able to identify network dependencies involving applications running in physical machines, VMs, and distinct OS-less containers. It should be understood that such network dependencies each indicate that an application is initiating or serving a request for/from a certain IP address and port number, but this is only half of an application dependency as the other application which is serving or initiating the same request, respectively, is not explicitly indicated. In order to determine application dependencies, network dependencies from multiple agents in different machines (physical and/or virtual) are collected in a central server and analyzed to identify, based on the network dependencies, the applications that depend on each other. For example, network data obtained from a Transmission Control Protocol (TCP) dump of one virtual bridge that is connected to OS-less containers and similar data obtained from another virtual bridge may be collected at the central server to identify dependencies between applications running in the containers. The identified application dependencies may then be displayed to a user via a user interface to, e.g., assist in datacenter migration.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
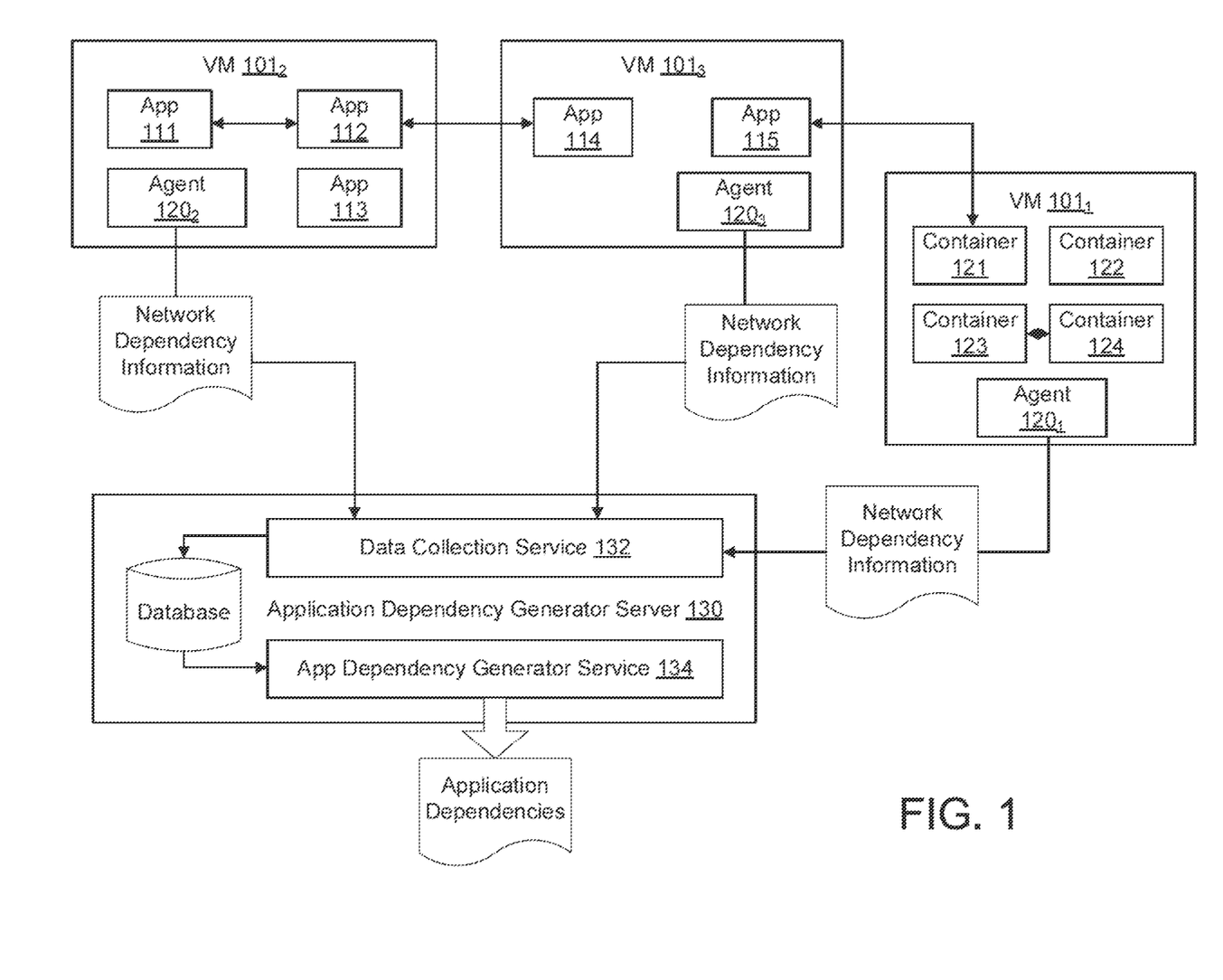
FIG. 1 illustrates an approach for identifying application dependencies and generating an application dependency graph, according to an embodiment.

FIG. 1 illustrates an approach for identifying network dependencies of applications and generating an application dependency graph, according to an embodiment. As shown, applications 111-113 and 114-115 run in VMs 101$_2$ and 101$_3$, respectively, while OS-less containers 121-124 run in VM $101_1$. Each of the VMs $101_{1-3}$ is a virtualization of a complete computer system with processors, memory, networking, storage, and/or BIOS. VMs $101_{1-3}$ run on a virtualization layer (also referred to as a "hypervisor") that abstracts processor, memory, storage, and/or networking resources into multiple virtual machines (e.g., VMs $101_{1-3}$) that run side-by-side on the same physical host computer. That is, the virtualization software partitions the physical host computer into multiple secure and portable virtual machines that run on the same physical computer. In one embodiment, virtualization software may be installed directly on the server hardware and inserts a virtualization layer between the hardware and the operating system. Alternatively, the virtualization software may run on top of a conventional operating system in the server. Although depicted as VMs $101_{1-3}$ in FIG. 1, it should be understood that techniques disclosed herein are applicable to physical machines as well, i.e., that any of VMs $101_{1-3}$ could instead be a physical machine.

In contrast to VMs. OS-less containers 121-124 implement operating system-level virtualization in which an abstraction layer is provided on top of the kernel of an operating system. As discussed, the abstraction layer supports multiple OS-less containers 121-124, each including an application and running as an isolated process in userspace on the operating system of VM $101_1$ while sharing the kernel with other containers. By using OS-less containers, resources can be isolated, services restricted, and processes provisioned to have a private view of the operating system with their own process ID space, file system structure, and network interfaces. Multiple containers may share the same kernel, but each container can be constrained to only use a defined amount of resources such as CPU, memory and I/O.

Illustratively, applications 111-112 depend on each other, as do applications 112 and 114. Application 115 and an application miming inside OS-less container 121 depend on each other as well. Further, applications running in OS-less containers 123-124 also depend on each other. In order to identify dependencies of the applications, and in particular dependencies involving applications running in OS-less containers 121-124, an application network monitoring agent $120_{1-3}$ is registered to each of the VMs $101_{1-3}$ (e.g., whenever a new VM is deployed or a VM without a monitoring agent is identified). Application network monitoring agent $120_{1-3}$ is responsible for identifying network dependencies of applications by monitoring network packets. In one embodiment, agents $120_{1-3}$ first discover the list of services running in VMs $101_{1-3}$ and network dependencies of the same. Then, if any of the services are OS-less container daemons that manage containers, which is the case for VM $101_1$, agent $120_1$ further identifies OS-less container services that are running and the external ports used by the container services to accept requests, the internal ports used by the container services to process requests, and the local IP addresses of the container services. Using a TCP dump from virtual Ethernet bridge 126 to which containers 121-124 are connected, agent $120_1$ captures network packet details from virtual bridge 126, which is used to identify network dependencies involving applications in OS-less containers. Such network dependencies, as well as network dependencies identified by agent $120_1$, are sent to application dependency generator server 130, which stores and analyzes the network dependencies to determine application dependencies.

As shown, application dependency generator server 130 is a web application which includes a data collection service 132 responsible for receiving network dependency information from agents $120_{1-3}$ and storing such information in a database, as well as an application dependency generator service 134 responsible for determining application dependencies using the stored network dependency information. In one embodiment, the stored information may include a list of registered agents $120_{1-3}$, a list of VMs in the datacenter, a list of the VMs running OS-less containers, a list of the containers present inside the VMs running OS-less containers and their mappings to the corresponding VMs, a list of applications running inside the VMs or OS-less containers or physical machines, and network communication details from one application to another. In another embodiment, dependency generator service 134 may determine application dependencies by generating a hash map which has from Internet protocol (IP) address, to IP address, and port number as keys and application names as values, and identifying each pair of applications associated with the same key in the hash map as being dependent on each other, as discussed in greater detail below. Dependency generator service 134 may further create an application dependency graph that indicates all application dependencies in the datacenter.

For example, assume that application 115 is an Apache Tomcat® web server application that depends on a Python™ web application running in OS-less container 121. Then, the dependency between the Tomcat® application 115 and the Python™ web application running container 121 may be determined in one embodiment as follows. Agent $120_3$ discovers applications running in VM $101_3$ by executing the Linux® command "netstat-nlpt," example output of which is shown in Table 1, and agent $120_3$ identifies from such output a list of processes, which will serve client requests, and their listening port numbers. Agent $120_3$ may also check for a Docker® OS-less container daemon service that manages containers using, e.g., the command "ps-aux|grep docker." However, no such service will be identified because no such service is running in VM $101_2$.

TABLE 1

| Proto | Recv-Q | Send-Q | Local Address | Foreign Address | State | PID/Program name |
|-------|--------|--------|---------------|-----------------|-------|------------------|
| tcp   | 0      | 0      | 0.0.0.0:22    | 0.0.0.0:*       | LISTEN | 15020/sshd     |
| tcp6  | 0      | 0      | :::8080       | :::*            | LISTEN | 15191/java     |

Agent $120_3$ further obtains the process descriptions for the processes using the command "ps-aux|grep pid." An example response to such a command is shown in Table 2.

TABLE 2 smannam 15191 0.2 8.3 1393336 85140 ? Sl
22:35 0:05 /usr/bin/java -
Djava.util.logging.config.file=/home/smannam/apache-
tomcat-7.0.57/conf/logging.properties -
Djava.util.logging.manager=org.apache.juli.ClassLoaderL
ogManager
Djava.endorsed.dirs=/home/smannam/apache-tomcat-
7.0.57/endorsed -classpath /home/smannam/apache-
tomcat-
7.0.57/bin/bootstrap.jar:/home/smannam/apache-tomcat-
7.0.57/bin/tomcat-juli.jar
Dcatalina.base=/home/smannam/apache-tomcat-7.0.57
-Dcatalina.home=/home/smannam/apache-tomcat- TABLE 2-continued

```
7.0.57 -
Djava.io.tmpdir=/home/smannam/apache-
tomcat-7.0.57/temp
org.apache.catalina.startup.Bootstrap start
```

By parsing the information in Tables 1 and 2, agent $120_3$ is able to identify that VM $101_2$ has a Tomcat® process running at port 8080. By continuously monitoring all network connections opened by the Tomcat® process, agent $120_3$ can identify network dependencies involving this process. For example, agent $120_3$ may use the command "netstat-ntupc|grep pid|prep-v listeningport" for this purpose, with pid being the process ID of the Tomcat® process. The response to such a command, an example of which is shown in Table 3, will include connections opened by this process.

TABLE 3

| Local Address | Foreign Address | State | PID/Program name |
|---|---|---|---|
| 10.112.73.92:51969 | 10.112.73.157:49153 | ESTABLISHED | 15191/java |

From such a response, agent $120_3$ can identify that the Tomcat® process has a dependency on a service running on 10.112.73.157 and listening at port 49153. It should be understood that, at this point, agent $120_3$ is unaware what the other service is. However, once a network dependency is identified, agent $120_3$ pushes this information to dependency generator server 130 in, e.g., the XML format shown in Table 4.

TABLE 4

```
<dependency>
    <from-ip>10.112.73.92</from-ip>
    <to-ip>10.112.73.157</to-ip>
    <port>49153</port>
    <app-name>tomcat</app-name>
    <isRequestInitator>true</isRequestInitiator>
</dependency>
```

Turning to VM $101_1$, agent $120_1$ running therein identifies services running in VM $101_1$ in a similar manner as that discussed above with respect to agent $120_3$. In particular, agent $120_1$ may check for network services running in VM $101_1$ using the netstat command "netstat-nlpt." As the Python™ web application is running in OS-less container 121, agent $120_1$ will not identify any network services with the netstat command. Agent $120_1$ further checks for a Docker® OS-less container daemon service using the command "ps-aux|grep docker." Once agent $120_3$ identifies that such a service is running in VM $101_1$, agent $120_1$ further identifies all container processes and their ports using the command "docker ps." The response to this command, an example of which is shown in Table 5, will list Docker® container processes running and the port numbers at which requests are expected.

TABLE 5

| CONTAINER ID | IMAGE | COMMAND | CREATED | STATUS | PORTS | NAMES |
|---|---|---|---|---|---|---|
| 7e8eb5fa447a | python webapp | python app.py | 4 hours ago | Up 4 hours | 0.0.0.0:49153->5000/tcp | condescending_mccarthy |

By parsing such a response, agent $120_1$ can identify OS-less container services and ports assigned to the same. In particular, agent $120_1$ may identify the external and internal ports used by the OS-less container process, which in this example are 49153 and 5000, respectively. Then, agent $120_1$ may obtain the IP address of the OS-less container services using the command "Docker inspect—format '{{.NetworkSettings.IPAddress}}' container_id," an example response to which may be "171.17.0.2." Thereafter, agent $120_1$ may capture, from virtual bridge 126, the network packets for each such OS-less container service using the TCP dump command "Tcpdump-I docker0|grep container_ip," an example response to which may be:

```
02:10:25.814181 IP 10.112.73.92.51969>
172.17.0.2.5000: Flags [F.], seq 202
```

-continued

```
02:10:25.814206 IP 172.17.0.2.5000 >
10.112.73.92.51969: Flags [.], ack 203
```

Agent $120_1$ is able to identify incoming and outgoing requests from the service by examining the port number in the packets. In this case, the port number used by the packets is a listening port number, indicating an incoming request which originated from 10.112.73.92 at port 51995. Agent $120_1$ then reports to server 130 the public address of the machine (physical or virtual) in which the OS-less containers are running and the public port that the OS-container service is using. For example, the report may be made in the XML, format shown in Table 6.

TABLE 6

```
<dependency>
    <from-ip>10.112.73.92</from-ip>
    <to-ip>10.112.73.157</to-ip>
    <port>49153</port>
    <app-name>python webapp</app-name>
    <isRequestInitator>false</isRequestInitiator>
</dependency>
```

Using both this information and the information obtained from VM $101_3$, illustrated in Table 4, application dependency generator service 134 can identify that the Tomcat® service running in VM $101_3$ depends on the Python™ webapp service running in the OS-less container in VM $101_1$. It will be understood that agent $120_1$ can also identify network dependencies of OS-less container services in a similar manner by examining outgoing network packet details from virtual bridge 126.

Figure 2:
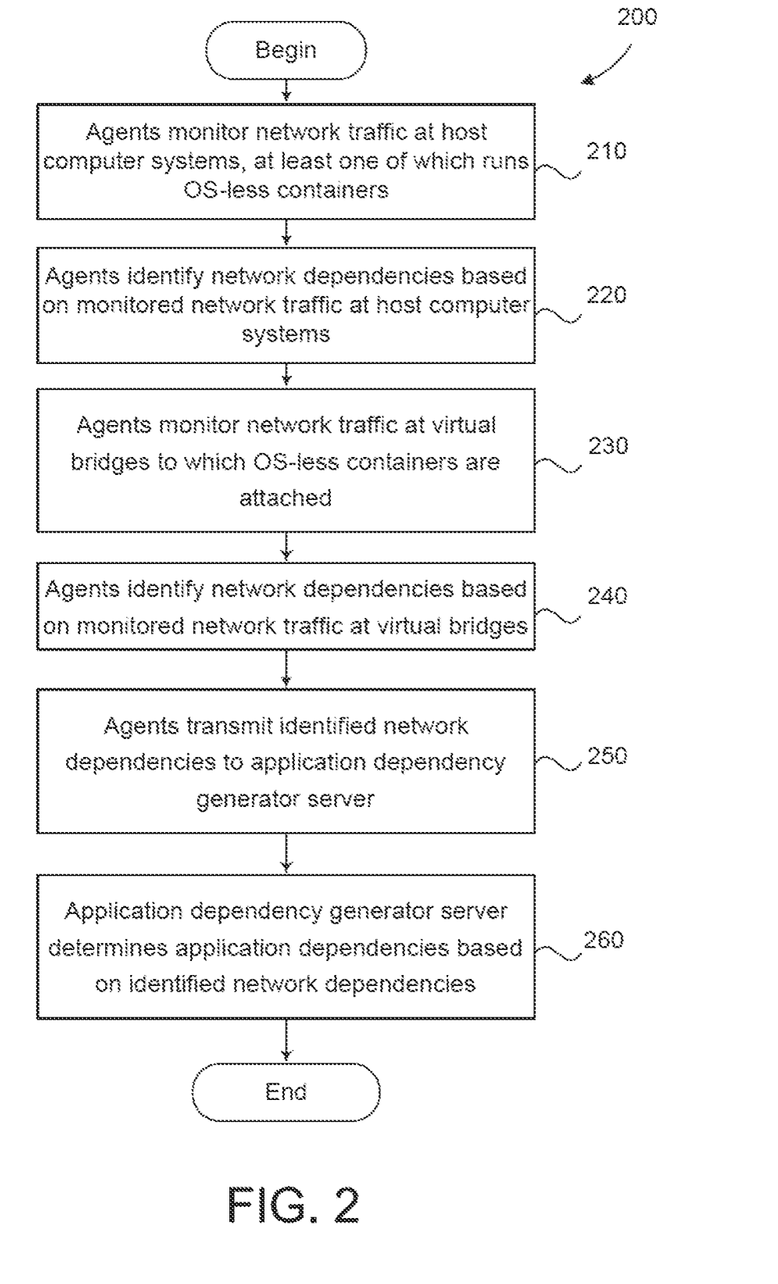
FIG. 2 illustrates a method for determining application dependencies in a hybrid environment, according to an embodiment.

FIG. 2 illustrates a method 200 for determining application dependency in a hybrid environment, according to an embodiment. As shown, method 200 begins at step 210, where agents $120_{1-3}$ monitor network traffic at host computer systems, at least one of which runs OS-less containers. It should be understood that the host computer systems may be virtual or physical machines. In one embodiment, agents $120_{1-3}$ first identify services running on the hosts using, e.g., the "netstat-nlpt" command. Agents $120_{1-3}$ then identify, for each service, the corresponding listening port and process ID, using which agents $120_{1-3}$ may obtain the process descriptions of the services using, e.g., the "ps-aux|grep pid" command and name the service accordingly. Agents $120_{1-3}$ then monitor network traffic by continuously monitoring each service using, e.g., the command "netstat-ntupc|grep pid" to identify incoming and outgoing connections. Agents $120_{1-3}$ will be able to differentiate incoming and outgoing connections by examining the port numbers used. If the port numbers are the same as listening port numbers, then the connections are incoming connections. Otherwise, the connections are outgoing connections from the service.

At step 220, agents $120_{1-3}$ identify network dependencies based on the monitored network traffic at the host computer systems. As discussed, agents $120_{1-3}$ are able to identify network dependencies of services and other systems which are dependent on the services using the network traffic information collected at step 210. For example, agents $120_{1-3}$ may identify network dependencies by examining connections opened by the services.

At step 230, agents $120_{1-3}$ monitor network traffic at virtual bridges to which the OS-less containers are attached. In one embodiment, agents $120_{1-3}$ first identify OS-less container daemon processes that manage OS-less containers using, e.g., the "ps-aux|grep daemon" command. If an OS-less container daemon is running, agents $120_{1-3}$ then identify a list of container services using, e.g., the "docker ps" command in the case of Docker® containers. Assuming such container services are running, agents $120_{1-3}$ further identify, for each container service, the external port used on the host system to accept service requests and the internal port used by the container service to process the same. In addition, agents $120_{1-3}$ obtain the assigned local IP address for each container service using, e.g., the command "Docker inspect—format '{{.NetworkSettings.IPAddress}}' container_id." Agents $120_{1-3}$ then capture network packet details from virtual bridges using, e.g., the TCP dump command "tcpdump-i docker0."

At step 240, agents $120_{1-3}$ identify network dependencies based on the monitored network traffic at the virtual bridges. The captured TCP dump discussed above provides incoming and outgoing packet details, using which agents $120_{1-3}$ may identify the list of network dependencies for each OS-less container service. Agents $120_{1-3}$ may also be able to distinguish between incoming and outgoing connections by examining the port numbers used by the network packets. If a packet has a listening port number, then the packet is associated with an incoming connection request. Otherwise, the packet is associated with an outgoing connection request from the service. Agents $120_{1-3}$ are thus able to identify systems which are dependent on the OS-less container services and dependencies of the same services.

At step 250, agents $120_{1-3}$ transmit the identified network dependencies to application dependency generator server 130. The identified network dependencies may be transmitted and stored in any format. Further, it should be understood that the transmitting of network dependencies may occur on a continual basis as new network dependencies are identified, rather than as one of a sequence of linear steps as shown in method 300. The following XML format ma be used to transmit newly identified dependencies in one embodiment:

```
<dependency>
    <from-ip>address 1</from-ip>
    <to-ip>address 2</to-ip>
    <port>port number</port>
    <app-name>application name</app-name>
    <isRequestInitator>Boolean value</isRequestInitiator>
</dependency>
```

In such a case, a database table with "from IP," "to IP," "port," "application name," and "is initiator" fields may then be updated with the transmitted values.

At step 260, application dependency generator service 134 determines application dependencies based on the identified network dependencies. After identified network dependencies are received by application dependency generator server 130, dependency generator service 134 is responsible for analyzing the network dependencies and determining application dependencies. As discussed, the network dependencies records each indicate that an application is initiating or serving a request for/from a certain IP address and port number, but this is only half of an application dependency as the other application which is serving or initiating the same request, respectively, is not explicitly specified. Accordingly, dependency generator service 134 matches network dependency records indicating applications initiating requests with corresponding network dependency records indicating other applications serving the same requests to determine that those applications have dependency relationships with each other.

In one embodiment, dependency generator service 134 generates an application dependency graph based on a hash map constructed with the network dependency information. In such a case, dependency generator service 134 may construct the hash map with the key being the "from IP," "to IP," and "port number" of the network dependencies that are stored by application dependency generator server 130, and the value being the corresponding applications. Doing so essentially groups the applications by the key "from IP," "to IP," and "port number." After such processing, each key should be associated with two values: one is a service provider application and the other a service requestor application. For example, one key-value pairing may be {([VM1 IP, VM2 IP, Port], [Web_app, Post-gres_db])}, which indicates that the "Web_app" and "Post-gres_db" have a dependency. Dependency generator service 134 is thus able to generate the application dependency graph that indicates all application dependencies based on such hash map entries. The dependencies may further be displayed to a user via, e.g., a graphical user interface.

Figure 3:
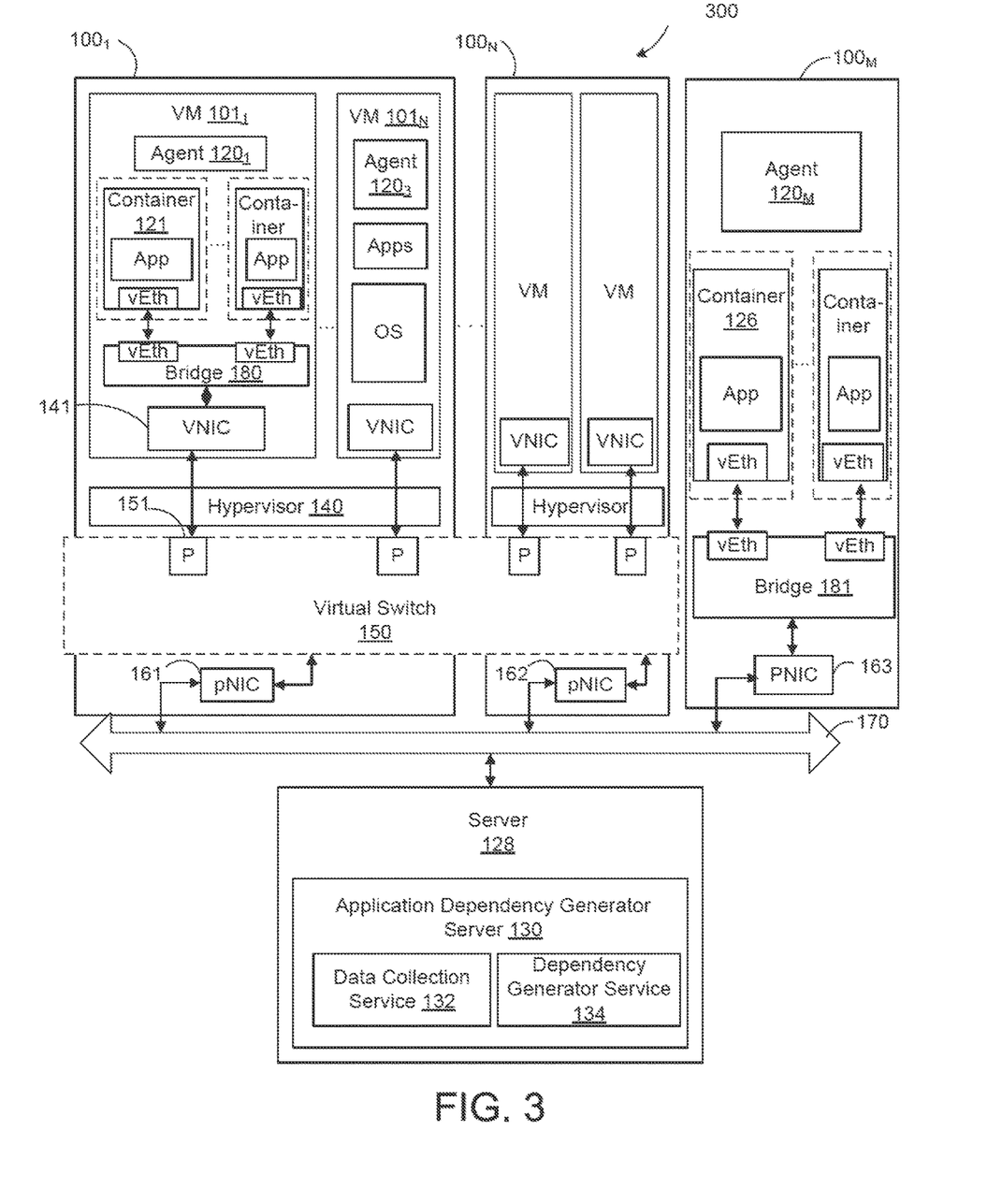
FIG. 3 illustrates components of a system in which an embodiment may be implemented.

FIG. 3 illustrates components of a system 300 in which an embodiment may be implemented. As shown, the system 300 includes a host computers $100_{1-N}$ and $100_M$ in communication with a server 128. Host computers $100_{1-N}$ are configured to deliver virtualization-based distributed services to information technology environments. Host computers $100_{1-N}$ may be constructed on conventional hardware platforms that include one or more central processing units, memory, and physical network interface cards (e.g., PNICs 161-162). As shown host computer $100_M$ is a physical server which may also include conventional hardware platforms, as it should be understood that techniques disclosed herein may be employed with physical computer systems that do not host virtual machines. For conciseness, the physical computer system embodiment, which works in a similar manner as the VM embodiment, will not be described in detail.

Illustratively, host computers $100_{1-N}$ each provides a virtualization layer (e.g., hypervisor 140) that abstracts processor, memory, storage, and/or networking resources into multiple virtual machines (e.g., VMs $101_{1-N}$) that run side-by-side on the same physical host computer $100_{1-N}$. That is, the virtualization software partitions physical host computers $100_{1-N}$ into multiple secure and portable virtual machines that run on the same physical servers. As discussed, each of the VMs (e.g., VMs $101_{1-N}$) represents a complete system with processors, memory, networking, storage, and/or BIOS. As shown, each of the VMs $101_{1-N}$ further includes a software-based virtual network adapter (e.g., VMC 141) that is logically connected to a physical network adapter (e.g., PNIC 161) included in the host computer, which provides network access for the virtual machine, via a virtual switch 150, which as shown is a disbuted virtual switch spanning multiple host computers $100_{1-N}$.

Illustratively, a guest OS runs in VMs $101_N$ and applications run on the guest OS. In contrast, OS-less containers (e.g., container 121) run in VMs $101_1$ and applications run in the OS-less containers. As discussed, OS-less containers such as container 121 implement operating systemlevel virtualization, where an abstraction layer is provided on top of the kernel of an operating system (not shown). The abstraction layer supports multiple OS-less containers each including an application, and each OS-less container runs as an isolated process in userspace on the host operating system and shares the kernel with other containers. Illustratively, a virtual Ethernet bridge 180 connected to VNIC 141 and the OS-less containers is responsible for forwarding packets between the network interfaces attached to bridge 180. When an OS-less container (e.g., container 121) is created, the abstraction layer that supports the OS-less containers also creates a pair of virtual Ethernet (vEth) interfaces, one of which is assigned to the new OS-less container's network namespace and the other of which is connected to bridge 180. The pair of vEths are tunnel drivers that act as a bidirectional pipe, with traffic entering one vEth in the pair exiting the other vEth.

As also shown, an application network monitoring agent (e.g., agent $120_1$) runs m each of VMs $101_{1-N}$. In one embodiment, these agents are configured to monitor network traffic at host computer systems (which would be VMs $101_{1-N}$ in this case), identify network dependencies based on the monitored network traffic at the host computer systems, further monitor network traffic at virtual bridges to which OS-less containers are attached, identify network dependencies based on the monitored network traffic at the virtual bridges, and transmit the identified network dependencies to application dependency generator server 130, according to method 200 discussed above with respect to FIG. 2. In turn, application dependency generator service 134 determines application dependencies based on the identified network dependencies by, e.g., constructing a hash map with the network dependency information and identifying pairs of applications which have a dependency relationship, as discussed above.

Advantageously, techniques disclosed herein permit application dependencies to be identified in a hybrid environment in which applications run in virtual machines (VMs) and physical servers, as well as in operating system (OS)-less containers. By knowing such application dependencies, cloud administrators can better plan for datacenter work load migrations. At the same time, application downtime due to partial datacenter migrations in which applications that are depended upon are not migrated can be avoided. Further, the maintenance period for a datacenter can be determined in advance and the user alerted to the application downtime. In addition, disaster recovery of applications can be planned earlier while accounting for application dependencies.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be Specially constructed for specific required purposes, or it may be a general purpose computer selectively activated or configured by a computer program stored in the computer. In particular, Various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of identifying application dependencies in a hybrid environment in which one or more applications run in operating system (OS)-less containers, where an OS-less container comprises a container without its own operating system that runs on a host operating system, comprising:
    monitoring network traffic at one or more host computer systems, wherein OS-less containers run in at least one of the host computer systems;
    monitoring network traffic at virtual bridges to which the OS-less containers are attached, wherein monitoring the network traffic at the virtual bridges includes:
        identifying OS-less container services running in the host computer systems;
        for each of the OS-less container services:
            identifying an external port used on a corresponding host computer system of the host comptuer systems to accept requests from the OS-less container service and an internal port used by the OS-less container to process the requests by issuing a request for information regarding the external port and the internal port to the host operating system, and
            obtaining an assigned local address for the OS-less container service; and
        capturing network packet details from the virtual bridges using Transmission Control Protocol (TCP) dumps;
    identifying network dependencies based on the monitored network traffic at the host computer systems and the monitored network traffic at the virtual bridges; and
    determining the application dependencies based on the identified network dependencies, wherein determining the application dependencies of a first application and a second application includes generating a hash map comprising from internet protocol (IP) address, to IP address, and port number as keys and applications as values, and wherein a dependency of the first application on the second application is identified when the first and second applications are associated with a same key in the hash map.

2. The method of claim 1, wherein the network traffic at the host computer systems and the network traffic at the virtual bridges are monitored via agents registered to the host computer systems.

3. The method of claim 2, wherein the agents further identify the network dependencies and transmit information on connections to a central service which determines the application dependencies.

4. The method of claim 1, wherein monitoring the network traffic at the host computer systems includes:
    identifying services running in the host computer systems;
    identifying a listening port for each of the services; and
    monitoring incoming and outgoing connections associated with the identified services.

5. The method of claim 1, wherein at least one of the host computer systems is a virtual machine.

6. The method of claim 1, further comprising, displaying the determined application dependencies to a user via a user interface.

7. A non-transitory computer-readable storage medium containing a program which, when executed by one or more processors, performs operations for identifying application dependencies in a hybrid environment in which one or more applications run in operating system (OS)-less containers, where an OS-less container comprises a container without its own operating system that runs on a host operating system, the operations comprising:
    monitoring network traffic at one or more host computer systems, wherein OS-less containers run in at least one of the host computer systems;
    monitoring network traffic at virtual bridges to which the OS-less containers are attached, wherein monitoring the network traffic at the virtual bridges includes:
        identifying OS-less container services running in the host computer systems;
        for each of the OS-less container services:
            identifying an external port used on a corresponding host computer system of the host comptuer systems to accept requests from the OS-less container service and an internal port used by the OS-less container to process the requests by issuing a request for information regarding the external port and the internal port to the host operating system, and
            obtaining an assigned local address for the OS-less container service; and
        capturing network packet details from the virtual bridges using Transmission Control Protocol (TCP) dumps;
    identifying network dependencies based on the monitored network traffic at the host computer systems and the monitored network traffic at the virtual bridges; and
    determining the application dependencies based on the identified network dependencies, wherein determining the application dependencies of a first application and a second application includes generating a hash map comprising from internet protocol (IP) address, to IP address, and port number as keys and applications as values, and wherein a dependency of the first application on the second application is identified when the first and second applications are associated with a same key in the hash map.

8. The non-transitory computer-readable storage medium of claim 7, wherein the network traffic at the host computer systems and the network traffic at the virtual bridges are monitored via agents registered to the host computer systems.

9. The non-transitory computer-readable storage medium of claim 8, wherein the agents further identify the network dependencies and transmit information on connections to a central service which determines the application dependencies.

10. The non-transitory computer-readable storage medium of claim 7, wherein monitoring the network traffic at the host computer systems includes:
identifying services running in the host computer systems;
identifying a listening port for each of the services; and
monitoring incoming and outgoing connections associated with the identified services.

11. The non-transitory computer-readable storage medium of claim 7, wherein at least one of the host computer systems is a virtual machine.

12. The non-transitory computer-readable storage medium of claim 7, the operations further comprising, displaying the determined application dependencies to a user via a user interface.

13. A system, comprising:
a processor; and
a memory, wherein the memory includes a program executable in the processor to perform operations for identifying application dependencies in a hybrid environment in which one or more applications run in operating system (OS)-less containers, where an OS-less container comprises a container without its own operating system that runs on a host operating system, the operations comprising:
monitoring network traffic at one or more host computer systems, wherein OS-less containers run in at least one of the host computer systems;
monitoring network traffic at virtual bridges to which the OS-less containers are attached, wherein monitoring the network traffic at the virtual bridges includes:
identifying OS-less container services running in the host computer systems;
for each of the OS-less container services:
identifying an external port used on a corresponding host computer system of the host computer systems to accept requests from the OS-less container service and an internal port used by the OS-less container to process the requests by issuing a request for information regarding the external port and the internal port to the host operating system, and
obtaining an assigned local address for the OS-less container service; and
capturing network packet details from the virtual bridges using Transmission Control Protocol (TCP) dumps; and
identifying network dependencies based on the monitored network traffic at the host computer systems and the monitored network traffic at the virtual bridges,
wherein the application dependencies are determined based on the identified network dependencies, wherein determining the application dependencies of a first application and a second application includes generating a hash map comprising from internet protocol (IP) address, to IP address, and port number as keys and applications as values, and wherein a dependency of the first application on the second application is identified when the first and second applications are associated with a same key in the hash map.

14. The system of claim 13, wherein the network traffic at the host computer systems and the network traffic at the virtual bridges are monitored via agents registered to the host computer systems.

15. The system of claim 14, wherein the agents further identify the network dependencies and transmit information on connections to a central service which determines the application dependencies.

* * * * *